June 23, 1959 J. H. ROWEN 2,892,158
NONRECIPROCAL CIRCUIT ELEMENT
Filed Aug. 6, 1956
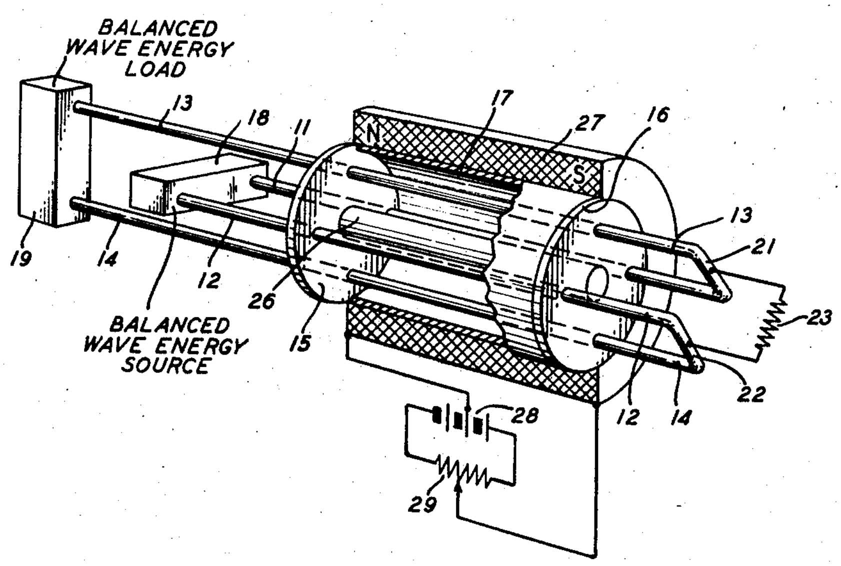
INVENTOR
J. H. ROWEN
BY Roy M. Porter, Jr.
ATTORNEY United States Patent Office 2,892,158

Patented June 23, 1959

2,892,158

NONRECIPROCAL CIRCUIT ELEMENT

John H. Rowen, Morris Township, Morris County, N.J., assignor to Bell Telephone Laboratories, Incorporated, New York, N.Y., a corporation of New York Application August 6, 1956, Serial No. 602,102

4 Claims. (Cl. 333—24)

This invention relates to nonreciprocal transmission circuits for electromagnetic wave energy and more particularly, to multibranch networks known as isolators for wave energy in the frequency ranges below a few thousand megacycles.

It is an object of the invention to couple electromagnetic wave energy from one balanced transmission line pair to a second transmission line pair for one direction of transmission therebetween, and to introduce substantial attenuation to wave energy transmitted in the opposite direction of transmission.

In my copending applications Serial No. 544,783, filed November 3, 1955, and Serial No. 485,280, filed January 31, 1955; and in the copending application of A. M. Clogston, Serial No. 485,281, filed January 31, 1955, there are disclosed structures and techniques for utilizing one or more of the several nonreciprocal effects produced by polarized elements of gyromagnetic material such as ferrite at frequencies of wave energy below a few thousand megacycles. Among these structures are included two branch coaxial, or balanced transmission line devices capable of introducing a nonreciprocal attenuation to wave energy in the frequency ranges in which coaxial and balanced transmission lines are used. These devices are known as isolators. Operation of these isolators depends upon the phenomena of gyromagnetic resonance absorption which works quite efficiently to isolate low powers but is incapable of introducing the large amount of reverse loss attenuation required in some high power applications.

It is, therefore, a further object of the invention to increase the reverse loss or isolation for isolators operating in the frequency ranges below the microwave range.

In accordance with the present invention, four conductors are arranged in diametrically opposite pairs with a longitudinally biased gyromagnetic element centrally disposed with respect to said conductors. Wave energy components applied from a connected electromagnetic wave device to one end of a first of the pairs will be transferred to the second of the pairs by the precessing electrons within the gyromagnetic material. As the energy propagates toward the other end of the structure, one-half of the applied energy will eventually be transferred to the second pair. At this point each conductor of one pair is connected to the adjacent conductor of the other pair that has the opposite polarity by a highly conductive shorting bar. The shorts cause total reflection of both halves of the power back toward the first end. The transfer of energy between the pairs by the electron precession is antireciprocal, however, and continues in the same sense regardless of the direction of propagation. Therefore, when the energy reaches the first end after reflection, it will be supported exclusively by the second pair for delivery to a connected output load.

However, if energy is initially applied to the second pair, for example, as a reflection from the load, the half of the energy transferred to the first pair will have such a phase that its resultant with the remaining energy on the second pair will be a voltage between the shorting bars. This energy is dissipated in a resistive element connected between the bars. Thus, no energy reaches the original source which is effectively isolated from its load.

These and other objects, the nature of the present invention, and its various advantages and features will appear more fully upon consideration of the specific illustrative embodiment shown in the accompanying drawing and described in the following detailed description of this drawing in which is shown a perspective view of an isolator in accordance with the invention interposed schematically between two balanced wave energy devices.

Referring more particularly to the drawing, an illustrative embodiment is shown comprising four similar elongated conductors or wires 11 through 14 that extend parallel to each other longitudinally and are located transversely at equally spaced points around the circumference of the circle. The radius of each conductor should be small compared to the distance between the nearest conductor centers. Thin transversely extending dielectric spacers 15 and 16 are longitudinally spaced to support the conductors relative to each other in this relationship. Support is also provided by a rigid cylindrical shield 17 which may be made of conductive, nonconductive or electrically dissipative material. Shield 17 protects conductors 11 through 14 from outside mechanical and electrical influences but otherwise plays no substantial part in the electrical operation of this embodiment.

The left hand extensions of diametrically opposed conductors 11 and 12 comprising one pair are connected to a balanced electromagnetic device 18 which in one particular application of the invention would constitute a source of wave energy, but which might also be a load circuit or other wave energy utilizing device or a coupling transducer which in turn couples to a source or a load in another application. The connection from device 18 to pair 11—12 is such that coupling is provided to and from wave energy of maximum voltage intensity lying in the plane of the pair and supported between the conductors. A load or other wave energy device 19 is similarly connected to the left hand ends of pair 13—14.

At the right hand end each conductor of one pair is connected to the adjacent conductor of the other pair by highly conductive shorting bars. Specifically, conductor 13 of pair 13—14 is connected by shorting bar 21 to conductor 11 of pair 11—12 and conductor 14 is connected by shorting bar 22 to conductor 12. A resistance 23 having power dissipating characteristics suitably large to dissipate the maximum reflection power that may be encountered in a given application is connected between shorting bars 21 and 22. Resistance 23 has a characteristic impedance that substantially matches the characteristic impedance between the bars.

In the region between the left and right hand ends of the conductors thus arranged a nonreciprocal coupling is provided between the pairs by an elongated cylinder or pencil shaped element 26 of gyromagnetic material similarly disposed with respect to conductors 11 through 14 and extending longitudinally along the center of the circle defined by the transverse locations of the conductors. Element 26 may be supported in this position by extending it through centrally located apertures in spacers 15 and 16.

The material of element 26 is of the type having electrical and magnetic properties of the type described by the mathematical analysis of D. Polder in Philosophical Magazine, January 1949, volume 40, pages 99 through 115. More specifically, element 26 may be made of any of the several ferromagnetic materials combined in a spinel structure. For example, it may comprise iron oxide with a small quantity of one or more bivalent metals such as nickel, magnesium, zinc, manganese, aluminum, or other similar material in which the other metals combine with the iron oxide in a spinel structure. This material is known as a ferromagnetic spinel or as ferrite. Frequently these materials are first powdered and then molded with a small percentage of plastic material according to the process described in the publication of C. L. Hogan, "The Microwave Gyrator" in the Bell System Technical Journal, January 1952. One specific material which is particularly suitable at the lower frequencies contemplated by the present invention is magnesium-manganese-aluminum ferrite which has been found to exhibit a ferromagnetic resonance effect at a lower frequency range than prior considered ferrites with values of biasing magnetic field that are obtainable in practice. These frequencies have been observed to include the frequency range from below 170 megacycles per second to 2,000 megacycles per second at field strengths ranging from less than approximately 200 to 850 oersteds, respectively.

Element 26 is biased by a polarizing magnetic field applied parallel to conductors 11 through 14. This field may be supplied by a solenoid 27 mounted upon the outside of shield 17 and supplied by an energizing current from source 28 and rheostat 29. As illustrated, rheostat 29 is connected across source 28 so that the current through solenoid 27 may be reversed, reversing the direction of the biasing field supplied to element 26. It should be noted, however, that element 26 may be magnetized by a solenoid of other suitable physical design, by a permanent magnet structure, or the material of element 26 may be permanently magnetized.

The coupling produced by element 26 can be explained by the recognition that the gyromagnetic material of element 26 contains unpaired electron spins which tend to line up with the applied field. These spins have an associated magnetic moment which can be made to precess about the line of the biasing magnetic field, keeping an essentially constant moment component in the direction of the biasing field and at the same time providing a moment component which may rotate in a plane normal to the field direction. Thus when a reciprocating high frequency magnetic field of electromagnetic wave energy is impressed upon the moment, the moment will commence to precess in one angular sense and to resist rotation in the opposite sense.

The combined effect of many such electrons and their associated moments produces in the gyromagnetic material not only a flux representing the impressed magnetic field but also a flux representing a reciprocating field at right angles in space to the applied field and displaced in time from the applied field by a phase determined by the direction of precession of the electrons and independent of the direction of propagation of a wave along the lines. The amplitude of the coupled wave depends upon the parameters of the ferrite and may also be controlled by the strength of the biasing magnetic field.

Thus, when wave energy is applied from source 18 to pair 11—12, a voltage field will be set up between the conductors with a magnetic field concentric with each conductor and having a maximum concentration extending between the conductors in a plane normal to the plane of the conductors. Since the electric and magnetic fields supported by pair 11—12 are respectively in quadrature with the fields supported by pair 13—14, the pairs are uncoupled or orthagonally related until the fields encounter element 26. The coupling produced by element 26 produces an induced magnetic field normal to the exciting field which in turn produces a voltage field extending between pair 13—14. Initially this induced field will be small, but as the distance from the excited end is increased, the field becomes increasingly larger. At an appropriate electrical distance to the right depending in a given structure, upon its physical length and the biasing field strength, the induced field will contain one-half of the energy. The phase of this induced energy relative to the remaining portion of the excited energy on pair 11—12, for the polarities indicated on solenoid 27, is such that when conductor 11 is positive with respect to conductor 12, conductor 14 is positive with respect to conductor 13. A voltage, therefore, exists between conductors 11 and 13 and conductors 14 and 12, these voltages being shorted by conducting bars 21 and 22 respectively. Since resistance 23 extends between points of equal potential, no energy is dissipated therein. A complete reflection back toward the first end, therefore, occurs for all energy. Since the transmission of energy between the pairs is antireciprocal, i.e., it continues in the same sense regardless of the direction of propagation, the components supported between pair 11—12 will be transferred to pair 13—14 as the wave propagates. At the point where the gyromagnetic coupling ceases, all energy will be supported between pair 13—14 for delivery to load 19 without substantial attenuation.

If energy is applied from device 19 acting now as the source of wave energy, or more probably, as an imperfectly matched load producing a reflection of energy, the constant direction of electron precession within element 26 will induce on pair 11—12 a voltage that makes conductor 12 positive with respect to conductor 11. Therefore, shorting bar 22 extends between conductors having equal positive voltages and shorting bar 21 extends between conductors having similar negative voltages. The total voltage is applied across resistance 23 in which it is substantially completely dissipated. No energy is reflected back to the first end to reach device 18.

Should the magnetic field supplied by solenoid 27 be reversed by moving rheostat 29 to a position on the other side of its center, the above-described directions of transmission and attenuation will be reversed. Thus, wave energy applied from device 19 will appear with substantially no attenuation at device 18. Reflections from device 18 will, however, be dissipated in resistance 23 and none will reach device 19.

In all cases it is understood that the above-described arrangements are illustrative of a small number of the many specific embodiments which can represent applications of the principles of the invention. Numerous and varied other arrangements can readily be devised in accordance with these principles by those skilled in the art without departing from the spirit and scope of the invention.

What is claimed is:

1. An isolator circuit comprising a plurality of elongated conductors being equally spaced transversely around the circumference of a circle with one conductor diametrically opposite each conductor and two conductors circumferentially adjacent each conductor, said conductors extending longitudinally parallel to each other, an elongated element of magnetically polarized gyromagnetic material extending parallel to said conductors through the center of said circle, a conductive shorting bar connecting one end of each conductor to an end of one of its adjacent conductors, and a dissipative impedance element connecting one bar to another.

2. The component according ot claim 1 including a source of electromagnetic wave energy connected between the other ends of one pair of diametrically opposite conductors and a load for said energy connected between the other ends of a different pair of diametrically opposite conductors.

3. An isolator circuit comprising four elongated conductors being disposed symmetrically relative to each other in diametrically opposite pairs, an elongated element of magnetically polarized gyromagnetic material centrally disposed with respect to said conductors, said conductors and said element extending parallel to each other, means for coupling wave energy having an electric field extending in the plane of one pair of conductors to and from said conductors on one side of said element, means for coupling wave energy having an electric field extending in the plane of the other pair of conductors to and from said conductors on said one side of said element, means on the other side of said element for reflecting an electric field having components polarized at 45 degrees to the planes of said pairs, and a resistive element on said other side connected from a conductor of one pair to a conductor of the other pair for dissipating voltage components polarized normal to said reflected components.

4. A nonreciprocal component comprising a plurality of elongated conductors being disposed symmetrically relative to each other in diametrically opposite pairs, an elongated element of magnetically polarized gyromagnetic material centrally disposed with respect to said conductors, said conductors and said element being parallel to each other between their longitudinal ends, means for coupling electromagnetic wave energy supported respectively by each of said pairs to and from said pairs at one of their ends, shorting members at the other end of each conductor of one pair for shorting it to a conductor of the other pair, and dissipative means connected between said shorting members.

References Cited in the file of this patent

UNITED STATES PATENTS

| | | |
|---|---|---|
| 2,748,353 | Hogan | May 29, 1956 |
| 2,767,379 | Mumford | Oct. 16, 1956 |

FOREIGN PATENTS

| | | |
|---|---|---|
| 1,111,860 | France | Nov. 2, 1955 |